United States Patent
Salame et al.

(10) Patent No.: US 8,515,833 B2
(45) Date of Patent: Aug. 20, 2013

(54) METHODS AND SYSTEMS FOR MULTILAYER PROVISIONING OF NETWORKED CONTACT CENTERS

(75) Inventors: Mansour Salame, Atherton, CA (US); Robert Townsend, Mt. View, CA (US)

(73) Assignee: 8x8, Inc., San Jose, CA (US)

( * ) Notice: Subject to any disclaimer, the term of this patent is extended or adjusted under 35 U.S.C. 154(b) by 653 days.

(21) Appl. No.: 12/201,671

(22) Filed: Aug. 29, 2008

(65) Prior Publication Data

US 2010/0054439 A1 Mar. 4, 2010

(51) Int. Cl.
*G06Q 10/00* (2006.01)
*H04M 3/42* (2006.01)

(52) U.S. Cl.
USPC ..................... 705/28; 379/201.12

(58) Field of Classification Search
None
See application file for complete search history.

(56) References Cited

U.S. PATENT DOCUMENTS

| | | | |
|---|---|---|---|
| 5,887,139 A | 3/1999 | Madison, Jr. et al. | |
| 6,005,931 A | 12/1999 | Neyman et al. | |
| 6,154,465 A | 11/2000 | Pickett | |
| 6,201,863 B1 | 3/2001 | Miloslavsky | |
| 6,278,777 B1 | 8/2001 | Morley et al. | |
| 6,393,467 B1 | 5/2002 | Potvin | |
| 6,553,115 B1 | 4/2003 | Mashinsky | |
| 6,687,241 B1 | 2/2004 | Goss | |
| 6,741,698 B1 | 5/2004 | Jensen | |
| 6,760,429 B1 | 7/2004 | Hung et al. | |
| 6,804,345 B1 | 10/2004 | Bala et al. | |
| 7,028,091 B1 | 4/2006 | Tripathi et al. | |
| 7,028,331 B2 | 4/2006 | Schwalb | |
| 7,124,171 B1 | 10/2006 | McCann | |
| 7,224,783 B2 | 5/2007 | Creamer et al. | |
| 7,328,001 B2 | 2/2008 | Dawson et al. | |
| 7,403,995 B2 | 7/2008 | Mace et al. | |
| 7,480,719 B2 | 1/2009 | Inoue | |
| 7,610,388 B2 | 10/2009 | Yamamoto | |
| 7,627,658 B2 | 12/2009 | Levett et al. | |
| 7,644,172 B2 | 1/2010 | Stewart et al. | |
| 7,730,204 B2 | 6/2010 | Pak | |
| 2002/0198943 A1 | 12/2002 | Zhuang et al. | |
| 2003/0123640 A1 | 7/2003 | Roelle et al. | |
| 2003/0172131 A1 | 9/2003 | Ao | |
| 2003/0195934 A1 | 10/2003 | Peterson et al. | |
| 2003/0195943 A1 | 10/2003 | Bradshaw et al. | |
| 2003/0208754 A1 | 11/2003 | Sridhar et al. | |
| 2003/0236907 A1 | 12/2003 | Stewart et al. | |
| 2004/0083292 A1 | 4/2004 | Lueckhoff et al. | |
| 2004/0088300 A1 | 5/2004 | Avery et al. | |
| 2005/0041647 A1* | 2/2005 | Stinnie | 370/352 |

(Continued)

FOREIGN PATENT DOCUMENTS

| | | |
|---|---|---|
| WO | WO-2010025110 A1 | 3/2010 |
| WO | WO-2010025112 A1 | 3/2010 |
| WO | WO-2010025113 A1 | 3/2010 |

OTHER PUBLICATIONS

"International Application Serial No. PCT/US2009/054780, Search Report mailed Oct. 8, 2009", 4 pgs.

(Continued)

*Primary Examiner* — Paul Danneman

(57) ABSTRACT

Embodiments of multilayer provisioning of networked contact centers comprise providing a support service, via a distributor, to a tenant, responsive to receiving a request from the tenant to modify the support provisioning the modified support service to the tenant.

24 Claims, 10 Drawing Sheets

(56) References Cited

U.S. PATENT DOCUMENTS

| | | |
|---|---|---|
| 2005/0047579 A1 | 3/2005 | Salame |
| 2005/0135600 A1 | 6/2005 | Whitman, Jr. |
| 2006/0026304 A1 | 2/2006 | Price |
| 2006/0239440 A1 | 10/2006 | Shaffer et al. |
| 2007/0127665 A1 | 6/2007 | Brandt et al. |
| 2007/0162908 A1* | 7/2007 | Erickson et al. ............. 718/104 |
| 2007/0192415 A1 | 8/2007 | Pak |
| 2008/0037760 A1* | 2/2008 | Boughton et al. ....... 379/265.02 |
| 2008/0072264 A1 | 3/2008 | Crayford |
| 2008/0177994 A1 | 7/2008 | Mayer |
| 2008/0178278 A1 | 7/2008 | Grinstein et al. |
| 2009/0055195 A1 | 2/2009 | Karlsgodt |
| 2009/0061850 A1 | 3/2009 | Li et al. |
| 2009/0064148 A1 | 3/2009 | Jaeck et al. |
| 2009/0066788 A1 | 3/2009 | Baum et al. |
| 2009/0133031 A1 | 5/2009 | Inoue |
| 2009/0190728 A1 | 7/2009 | Bushnell et al. |
| 2009/0216683 A1 | 8/2009 | Gutierrez |
| 2010/0054448 A1 | 3/2010 | Townsend et al. |
| 2010/0054450 A1 | 3/2010 | Southwick et al. |
| 2010/0054451 A1 | 3/2010 | Townsend |
| 2010/0057927 A1 | 3/2010 | Southwick et al. |
| 2010/0058234 A1 | 3/2010 | Salame et al. |
| 2010/0232583 A1 | 9/2010 | Bettis et al. |

OTHER PUBLICATIONS

"International Application Serial No. PCT/US2009/054780, Written Opinion mailed Oct. 8, 2009", 5 pgs.

"International Application Serial No. PCT/US2009/054787, Search Report mailed Oct. 13, 2009", 4 pgs.

"International Application Serial No. PCT/US2009/054787, Written Opinion mailed Oct. 13, 2009", 6 pgs.

"International Application Serial No. PCT/US2009/054788, Search Report mailed Oct. 13, 2009", 4 pgs.

Brown, Donald E, "The Interaction Center Platform", *Interactive Intelligence, Inc.*, (2005), 35 pgs.

"U.S. Appl. No. 12/201,599, Preliminary Amendment mailed Dec. 8, 2009", 10 pgs.

"U.S. Appl. No. 12/201,639, Preliminary Amendment mailed Jul. 1, 2010", 11 pgs.

"U.S. Appl. No. 12/201,726, Final Office Action mailed Apr. 18, 2011", 16 pgs.

"U.S. Appl. No. 12/201,726, Non-Final Office Action mailed Oct. 12, 2010", 17 pgs.

"U.S. Appl. No. 12/201,726, Response filed Jan. 12, 2011 to Non-Final Office Action mailed Oct. 12, 2010", 13 pgs.

Fielding, et al., "HTTP/1.1: Connections, 8 Connections", Part of Hypertext Transfer Protocol—HTTP/1.1, RFC 2616, [Online]. Retrieved from the Internet Jan. 12, 2011: <URL: http://www.w3.org/Protocols/rfc2616/rfc2616-sec8.html>, 6 pgs.

Infrequently Noted, "Comet: Low Latency Data for the Browser", [Online]. Retrieved from the Internet: <URL:http://infrequently.org/2006/03/comet-low-latency-data-for-the-browser>, (Mar. 3, 2006), 5 pgs.

McCarthy, Philip, "Ajax for Java developers: Write scalable Comet applications with Jetty and Direct Web Remoting", [Online]. Retrieved from the Internet: <URL: http://www.ibm.com/developerworks/java/library/j-jettydwr/index.html>, (Jul. 17, 2007), 16 pgs.

* cited by examiner

METHODS AND SYSTEMS FOR MULTILAYER PROVISIONING OF NETWORKED CONTACT CENTERS

TECHNICAL FIELD

This application relates generally to methods and systems for managing networked contact centers, and more specifically for multilayer provisioning of networked contact centers.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, CONTACTUAL, INC., All Rights Reserved.

BACKGROUND

Traditionally, contact centers are referred to as call centers and designed to enable a company to handle calls from their clients. The calls received from the clients may be distributed to multiple call agents according to certain call distribution and handling methodologies. Ideally, a call center is designed to handle calls with minimal client waiting time, minimal dropped calls, even call distribution to agents, and minimal downtime. Any drastic fluctuations in one or more of these criteria may result in loss of business and/or customer dissatisfaction.

The call centers are normally configured to be operated on-premise using proprietary systems with propriety hardware and software. These on-premise call center systems are generally very costly to maintain. The systems typically require internal support staff. Furthermore, the systems may be inflexible in the type of applications and hardware that can be supported, limiting the company's ability to upgrade and grow along with any potential increase in demand. Even when the upgrade options are available, they tend to be very costly and may require replacing a current system with another more advanced system, causing further stress to the supporting staff, the agents and the clients. Further, as the number of on-premise call center systems installation increases, support requirements on the manufacturers of these on-premise call center systems may also increase.

BRIEF DESCRIPTION OF DRAWINGS

Some embodiments are illustrated by way of example, and not limitation, in the figures of the accompanying drawings in which.

DETAILED DESCRIPTION

Figure 1:
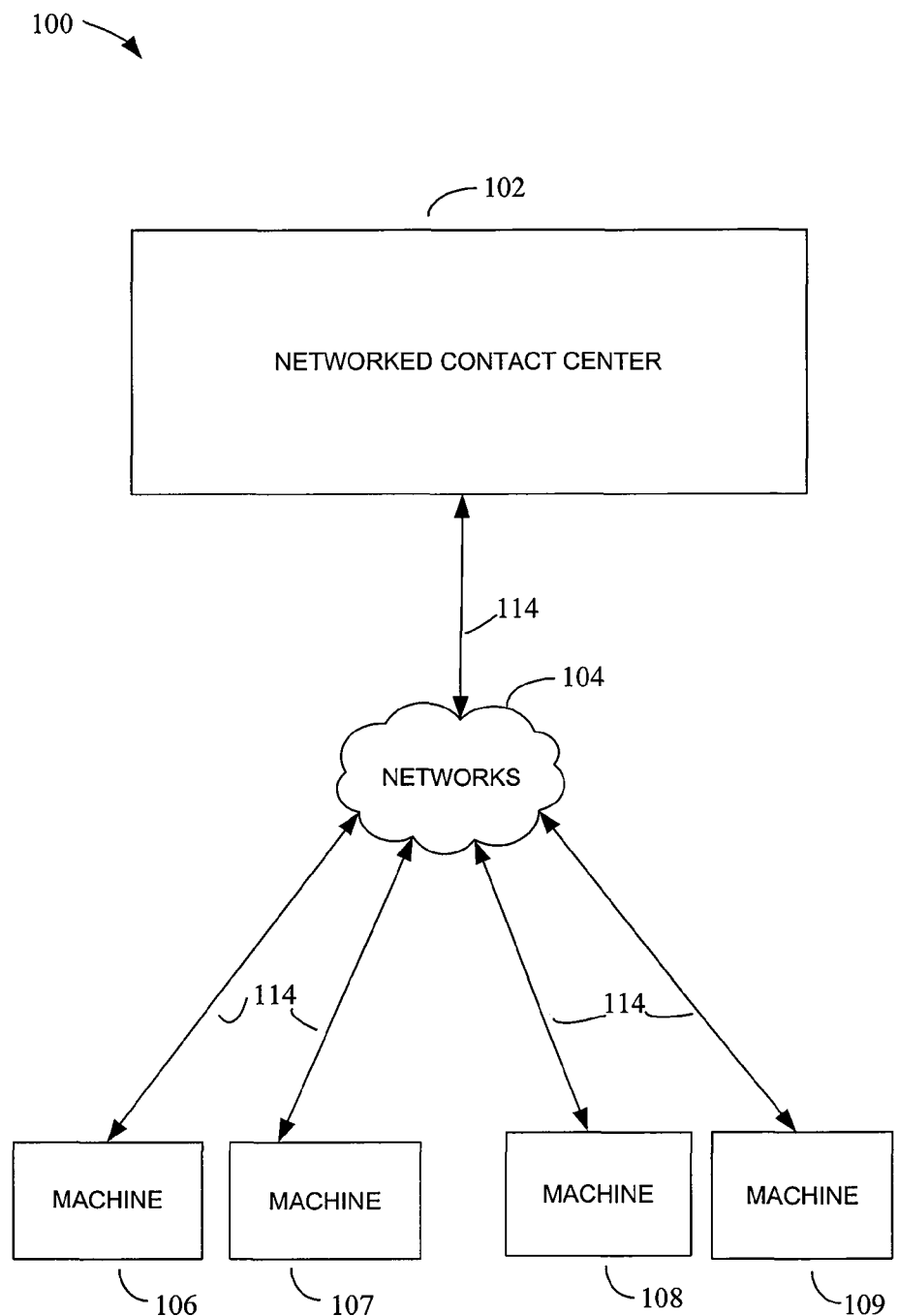
FIG. 1 is a high-level diagrammatic representation of an on-demand networked contact center, in accordance with an example embodiment.

For some example embodiments, methods and systems for managing networked contact centers via one or more distributors are disclosed. The one or more distributors may be used to provide services from a networked contact center to a plurality of tenants. In response to receiving a request from the tenant to modify the services, the networked contact center provides the modified services with minimal or no involvement by the distributors.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Introduction

Methods and systems for multilayer provisioning of networked contact centers are described herein. In one example embodiment, a networked contact center is a hosted service to provide services such as responses to telephone calls, email, instant messages, chats, SMS, and video. An example networked contact center is described in more detail below with reference to FIG. 1. The methods and systems for multilayer provisioning described in the example embodiments herein may permit handling multilayer distributions, reseller Graphical User Interface (GUI) branding, and per agent language localization with minor or no cost to distributors of the service. Additionally, multilayer provisioning of networked contact centers may be achieved nearly instantaneously with change requests being directed to one central location.

Provisioning may refer to providing telecommunication services (e.g., voice telecommunications) to a user, including transmission, wiring, and equipment associated with such services. Provisioning may further be utilized to configure systems and to provide users with access to data and technology resources and monitor access rights and privileges.

For some example embodiments, the networked contact center may provide hosted services. These hosted services may be provided via one or more layer of service distribution. Revenues of a company associated with the networked contact center may be generated by and received from the distributors. In some situations, most of the revenues may come from only a few layers of distribution, e.g., distributor and sub-distributor. A distributor or sub-distributor may buy rights to sell services but may have to provide their own infrastructure to support these services. Additionally, any customizations or changes associated with the scalability of the services may have to be configured by the distributor or sub-distributor.

For some example embodiments, the methods and systems for multilayer provisioning of networked contact centers described herein may permit centralized provisioning of services on behalf of the distributors. For example, a distributor may not need to actively participate in the process of resolving service requests by its customers. One advantage of this approach is to enable the distributors to be more willing to sell the services offered by the networked contact center. Additionally, some distributors may have well-known brands that may facilitate selling of the services. The price paid by the clients for a brand may be higher but no additional cost associated with the distribution of services would be needed. A distributor may initially request the centralized host to provide a private label for the services sold by the distributor. However, no further action by the distributor may be needed. A client may then configure the services without knowing that the distributor is only a passive participant. In fact, the services are provided by the centralized host.

For example, a client, instead of contacting the distributor, may use the client interface to request modifications to the services provided by the hosted center. One of the configurations that the client may be willing to change is the number of users that the services may support simultaneously. The hosting company may be able to provide the requested services as long as the client does not violate predetermined limits (e.g., maximum number of users) or the limits set for the distributor. Additions of users up to the limit set per a particular tenant or per particular distributor may be prepaid or postpaid. In another example, distributors may provision services without the service provider. In such case, tenant capacity may be limited based on the tenant's creditworthiness.

A conventional company providing hosted services, lacking the provisioning capabilities described herein, may have its distributors contact the hosting company in order to request additional lines of service. Methods and systems for multilayer provisioning of networked contact centers permit a higher efficiency distribution because only one hosting infrastructure may be needed. At the same time, custom configurations may be available to the client to permit customization and scalability of the services. As long as the maximum number of users is not violated, the modifications may be performed automatically, thus eliminating a need for human interaction on the part of the distributor.

The methods and systems for multilayer provisioning thus include an ability to delegate, which is based on the business rules, and to change the business rules without violating predetermined limits.

Networked Contact Center

FIG. 1 is a block diagram showing an example networked contact center 100, in accordance with an example embodiment. FIG. 1 is shown to include a networked contact center 102 that is communicatively coupled with networks 104, via transmission media 114. Also communicatively coupled with the networks 104, via the transmission media 114, are machines 106-109. One or more of the machines 106-109 may be used by call agents or call supervisors associated with a company (also referred to as a tenant). One or more of the machines 106-109 may be used by customers or potential customers of the company.

The networks 104 may be used to communicatively couple the networked contact center 102 with the machines 106-109. In an example embodiment, networks 104 include the Internet and a public switched telephone network (PSTN). Other types of networks may be included within the networks 104 without departing from the claimed subject matter. The transmission media 114 may include any transmission media appropriate for supporting the networks 104. In an example embodiment, the transmission media 114 may include one or more of optical fiber, twisted pairs and wireless media. Other transmission media not described may also be used.

Contact made between the networked contact center 102 and the various machines 106-109 may include various modes of communications (e.g., electronic communications) that may be digitally encoded, composed of analog signals and/or include a combination of digital and analog communication. Some example types of contact may include communications made via Voice Over Internet Protocol (VOIP), analog telephone, online chat, text messaging, electronic mail (email), video conferencing, screen sharing, web conferencing and file sharing, radio broadcast, etc. It is to be appreciated that example forms of communication are provided herein to illustrate types of contact and not to limit the meaning of contact to certain forms of communication.

The networked contact center 102 may perform various contact related tasks (described in more detail below), on behalf of one or more tenants. The networked contact center 102 may be implemented in software, hardware or a combination of both software and hardware. The networked contact center 102 may comprise contact center machines (not shown) that execute instructions to perform the various contact related tasks (e.g., call distribution, call routing, call prioritizing, call transferring, etc.). One or more of the contact center machines may include interface hardware to communicate with the machines 106-109 via the transmission media 114 and the networks 104. It may be noted that the number of customers, agents or supervisors (and e.g., machines used by the customers, agent and supervisors) that communicate with the networked contact center 102 may be significantly increased when the number of tenants supported by the networked contact center 102 also increases. One or more of the contact center machines may be responsible for storing data associated with the one or more tenants. The data may include, for example, tenant-specific call configuration, agents' identification, supervisors' identification, call recordings, call statistics, etc. For some example embodiments, there may be multiple instances of the same data that may be used as backup and for recovery purposes.

Tenant

A tenant is an entity (e.g., a company, an employer, etc.) that seeks to address contact made by other entities (e.g., customers, employees, associates, etc.) with which the tenant has a relationship. To help respond to such contact, an example tenant may use the networked contact center 102 to receive the contact, organize the contact, allocate the contact, transmit the contact and to perform other contact center related services for the benefit of the tenant. In addition to using the networked contact center 102, a tenant may look to yet further entities (e.g., agents, consultants, business partners, etc.) to help address the various contact referred to above (e.g., contact from the customers, associates, etc.).

Entities such as, for example, agents and customers may transmit and/or receive communications using the machines 106-109. The machines 106-109 may include interface hardware (not shown) and software to transmit and/or receive communications via the transmission media 114 to and/or from the networks 104 and the networked contact center 102. It is to be noted that the machines 106-109 may represent different types of machines (e.g., personal computers (PCs), mobile devices, telephones or any other network device). In an example embodiment, an entity associated with the machine 106 is a tenant's agent and a different entity associated with the machine 108 is the tenant's customer. In various example embodiments, on behalf of the tenant, the agent using the machine 106 may communicate via the networks 104 and the networked contact center 102 with the customer that is using the machine 108.

Contact Center Functional Modules

Figure 2:
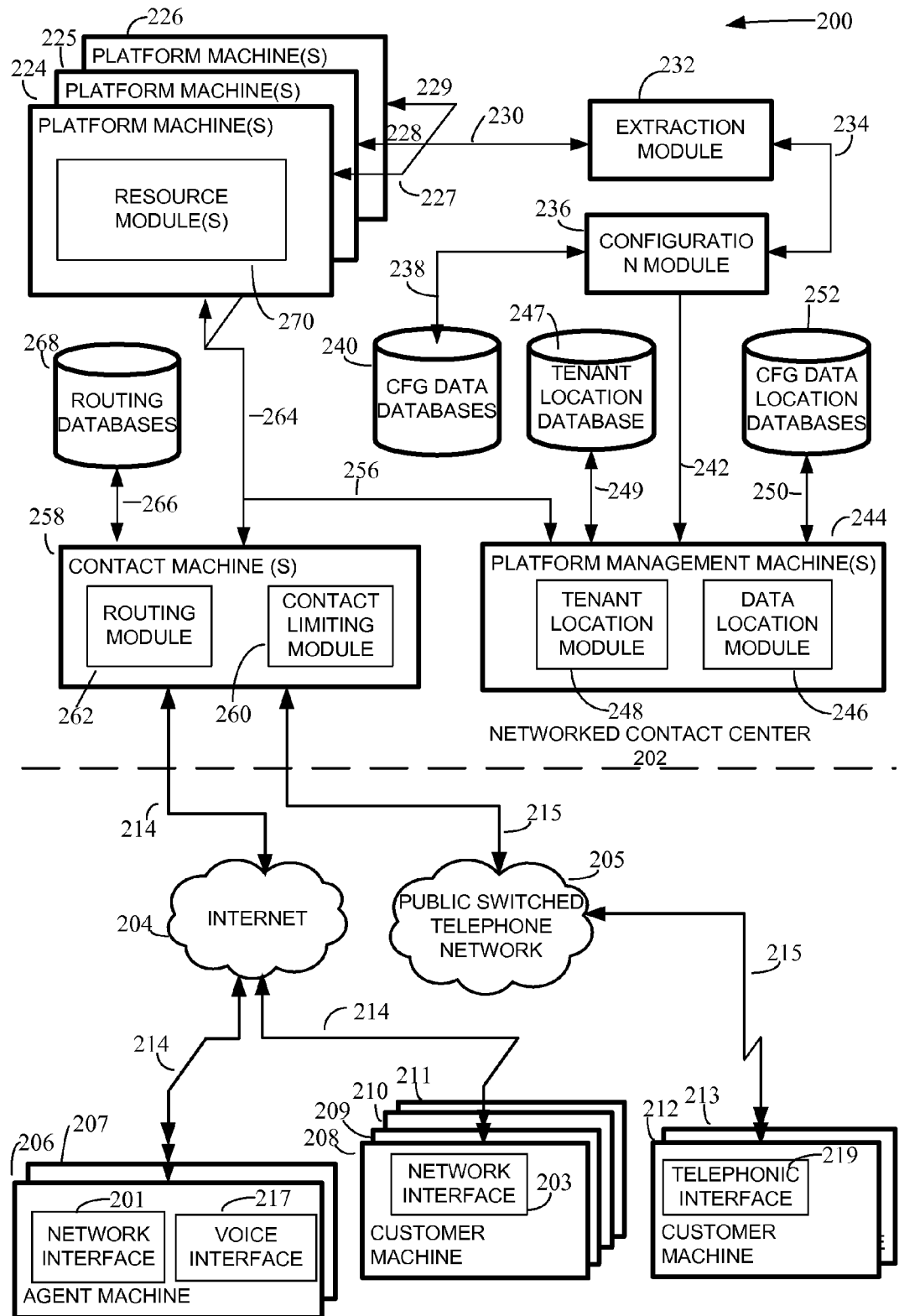
FIG. 2 is a further diagrammatic representation of an on-demand networked contact center, in accordance with an example embodiment.

FIG. 2 is a block diagram illustrating a network 200, in accordance with an example embodiment. The network 200 is shown to include an example networked contact center 202 communicatively coupled with agent machines 206, 207 and customer machines 208-211 via the transmission media 214 of the Internet 204. The example networked contact center 202 is further communicatively coupled with customer machines 212 and 213 via the transmission media 215 of the PSTN 205.

Although the current example may illustrate customers and agents associated with one tenant, it is to be understood that the networked contact center 202 may be configured to support or host multiple tenants (and therefore may also be referred to as a hosted networked contact center or just a hosted contact center). For some example embodiments, the tenants may not need to install any call-distribution system on-premise. To host these multiple tenants, the networked contact center 202 may include multiple platforms and databases to store configurations specific to each tenant. The networked contact center 202 may also implement backup and recovery schemes to reduce system down time.

Figure 3:
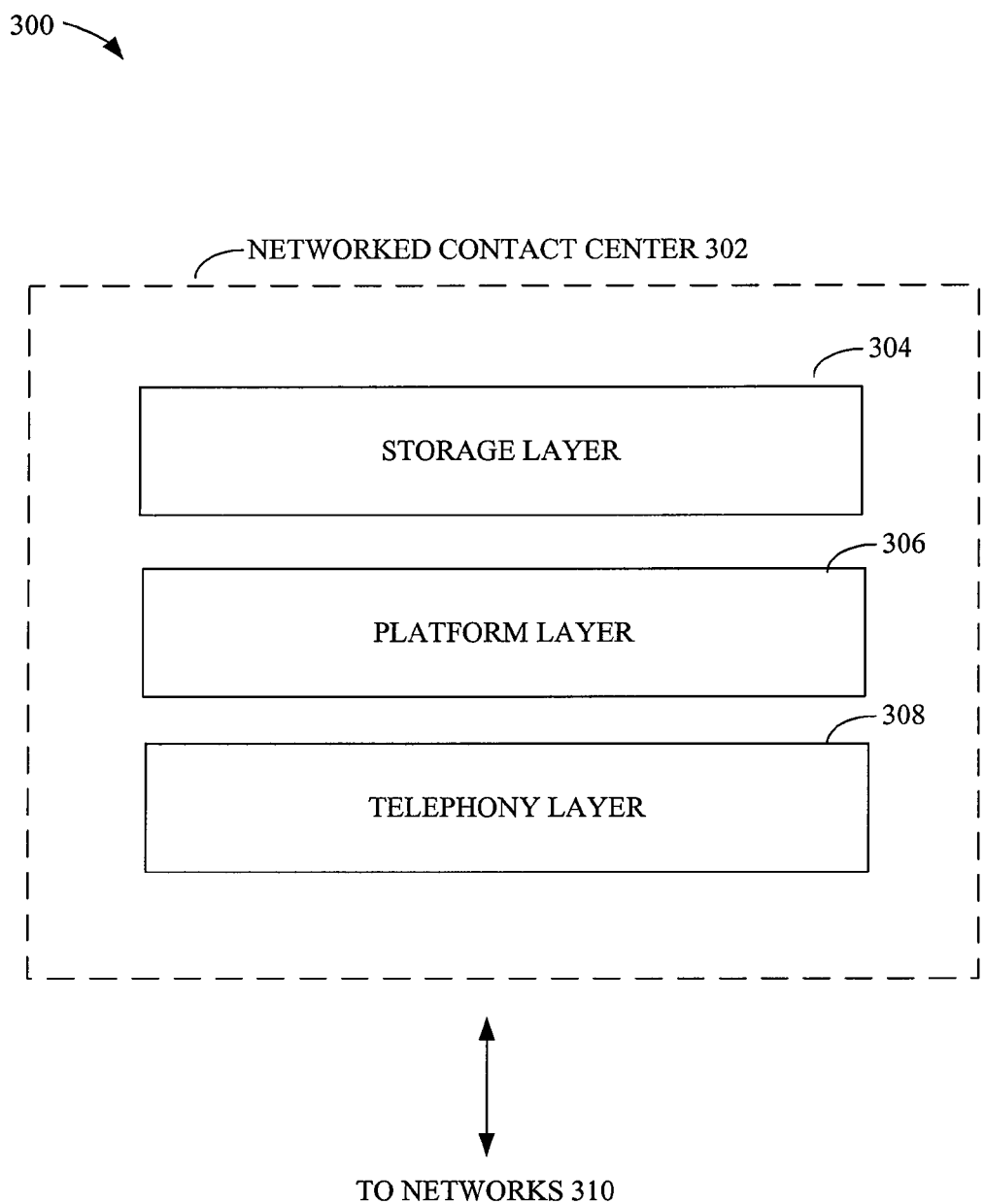
FIG. 3 is a block diagram illustrating a further network including a networked contact center organized into layers, in accordance with an example embodiment.

FIG. 3 is a block diagram illustrating a further network 300 including networked contact center 302 organized into layers, in accordance with an example embodiment. The networked contact center 302 may be substantially similar to the networked contact center 202 of FIG. 2. The networked contact centers 202, 302 may be organized into multiple logical groups or layers. There may be a storage layer 304, a platform layer 306 and a telephony layer 308. For some example embodiments, the telephony layer 308 may be responsible for receiving calls that come into the networked contact centers 202, 302. Depending on the dialed number associated with the call, the telephony layer 308 distributes the call to an appropriate platform in the platform layer 306. For some example embodiments, each platform in the platform layer 306 may be associated with one or more machines (also referred to as platform machines). Each platform server may support one or more tenants. For some example embodiments, each tenant may be associated with two or more platforms. A first platform may be used as a primary platform, and a second platform may be used as a backup platform. Incoming calls distributed to a tenant may always be directed to the primary platform unless the tenant is reconfigured to direct the incoming calls to the backup platform. For some example embodiments, the backup platform is operational while the primary platform is operational even when all calls are being processed by the primary platform. This may be valuable when there are problems with the primary platform since switching the operations to the backup platform may not cause too much delay in the call handlings associated with the tenant.

For some example embodiments, the multiple platforms in the platform layer 306 may share the same data in the storage layer 304. The storage layer 304 may be associated with databases and associated database machines. The storage layer 304 may itself be partitioned into multiple images for backup and recovery and for efficient access. For some example embodiments, mappings may be used to relate a tenant on a particular platform to the tenant's data in the storage layer 304.

Thus, the networked contact center 302 may include logic to receive calls, to determine to which of the multiple supported tenants the calls belong, to distribute the calls to the right platform, and to determine where the data associated with the tenant may be found.

Using the organization described above, the networked contact center 102 may be easily upgraded and maintained with little or minimal impact to the tenant. For example, a tenant may be operating with a backup platform while the primary platform is upgraded from one software level to another software level. Once the upgrade is completed, operations may be switched back to the primary platform. Similarly, because both the primary platform and the backup platform share the same data in the storage layer 304, switching from the backup platform to the primary platform can be accomplished with minimal impact to the tenant and system availability. It may be noted that some calls may be affected during the switch; however, as is typical with telephone calls, the customers may re-dial or call the tenant again. It may be likely that the re-dialed calls may be received by the networked contact center 102 after the switch is complete.

Referring to FIG. 2, platform machines 224-226 may be communicatively coupled with an extraction module 232 via communication channels 227-229, respectively, and communication channel 230. Platform machines 224-226 are further communicatively coupled to contact machine(s) 258. The contact machine(s) 258 are communicatively coupled with the routing databases 268 via the communication channel 266.

Platform management machine(s) 244 are shown to be communicatively coupled with configuration data location databases 252 via communication channel 250, the tenant location database 248 via communication channel 249 and with the contact and platform machine(s) 258 and 224-226, respectively, via the communication channels 256 and 264. The platform management machine(s) 244 are further shown to be communicatively coupled with the configuration module 236 via communication channel 242, while the configuration module 236 is communicatively coupled with the extraction module 232 and the configuration data databases 240 via communication channels 234 and 238, respectively. The machines and modules of FIG. 2 are to be described in further detail with respect to FIG. 4, which follows.

Figure 4:
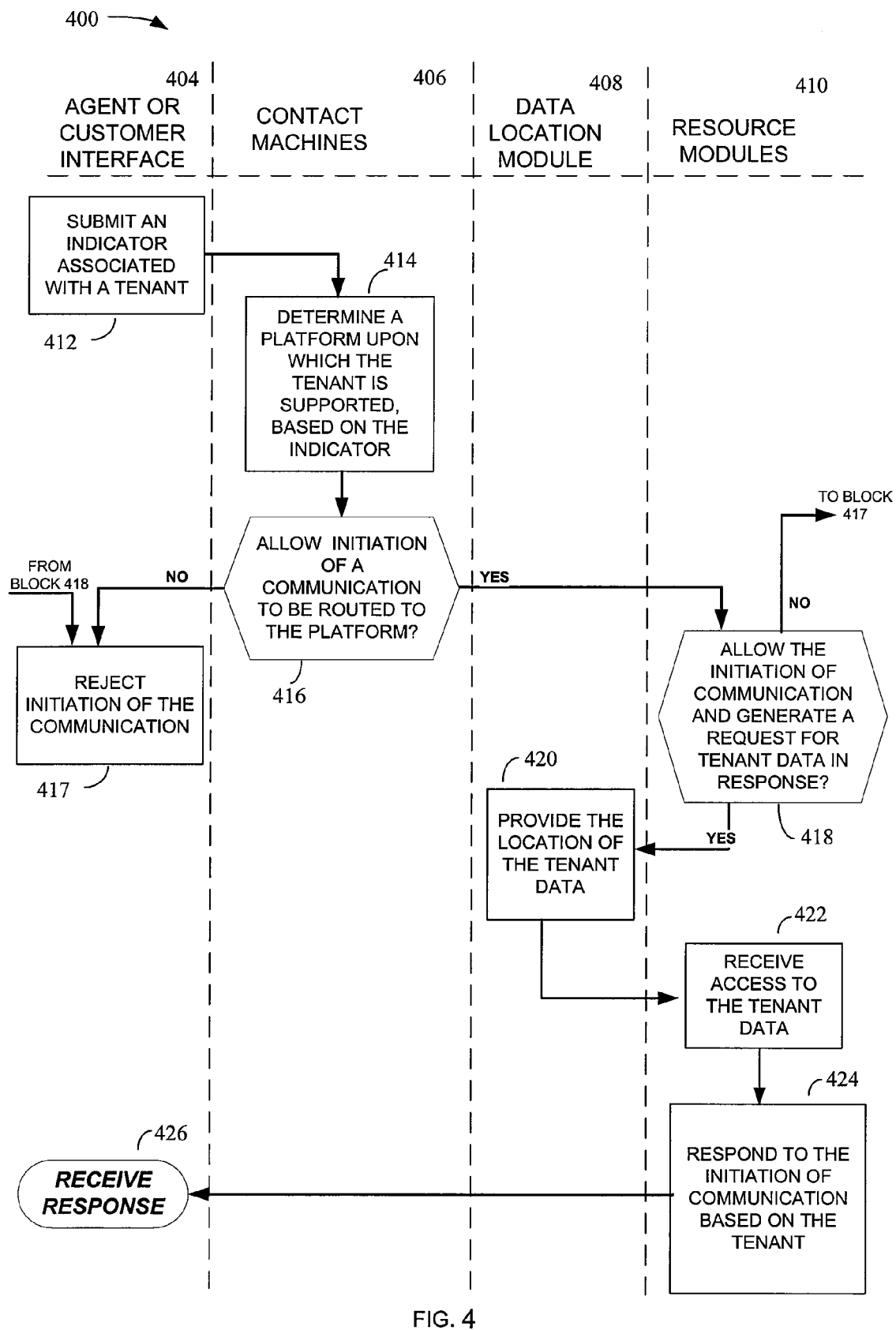
FIG. 4 is a flow diagram illustrating example actions performed by various on-demand contact center components in response to agent or customer contact, in accordance with an example embodiment.

FIG. 4 is a flow diagram 400 showing example actions performed by various components of a contact center for responding to agent or customer contact, in accordance with an example embodiment. In FIG. 4, each column represents a lane in which action(s) are carried out. Actions in lanes 404, 406, 408 and 410 may be performed by certain machines and/or modules shown in FIG. 2. It may be noted that a module may represent software, hardware and/or a combination of software and hardware used to implement logical constructions and/or to process instructions. Although shown in separate lanes, one module may be included in, or composed of, one or more of the other modules.

The flow diagram 400 may begin at block 412 with an agent or customer submitting an indicator associated with a tenant along with an initiation of communication. In FIG. 2, the customer machine 212 is shown to include a telephonic interface 219 (e.g., a telephone with a handset). In an example embodiment, a customer seeking customer support from a tenant dials a tenant's phone number on a telephone to place a call (e.g., initiation of communication) to the contact center over the PSTN. In an example embodiment, the telephone number itself serves as an indicator of the tenant whose attention is sought by the customer.

The customer machine 208 is shown to include a network interface 203 (e.g., a web browser) with which a customer may, for example, submit a chat request to the networked contact center 202 over the Internet to receive, for example, technical support from a tenant. An agent of the tenant or a contact supervisor may also contact the tenant. In an example embodiment, an agent using the agent machine 206 uses the network interface 201 to log on to an agent network server hosted by the networked contact center 202 to notify the networked contact center 202 that the agent is available to be contacted by customers. In some example embodiments, the agent may use the voice interface 217 to speak with a customer or another agent.

In various example embodiments, the indicator submitted at block 412 is received by the contact machines(s) 258. In FIG. 2, the contact machine(s) 258 are shown to include a routing module 262 and a contact limiting module 260. The routing module 262 may route contacts to a certain platform depending on the tenant indicated by the indicator (e.g., a phone number, username/password or any other indicator designating a tenant). The example contact limiting module 260 may regulate incoming contact with the networked contact center 202.

At block 414, the routing module 262 within the contact machines 258 of FIG. 2 may determine a platform upon which the tenant is supported based on the indicator received from the agent or customer at block 412. In an example embodiment, in FIG. 2, the routing module 262 accesses the routing databases 268 via communication channel 266 to associate an indicator with a tenant and a platform. In some example embodiments, the contact machine(s) 258 submit a request, via the communication channel 256 to the platform management machine(s) 244 to determine a platform associated with the indicator (e.g., and a tenant corresponding to the indicator).

At decision block 416, the example flow diagram 400 includes the example contact limiting module 260 within the contact machines 258 of FIG. 2 determining whether to allow the initiation of communication (e.g., a telephone call from a customer) to be routed to a platform (e.g., the platform machine(s) 224).

The contact limiting module's 260 determination of whether to allow the initiation of communication may include referencing a current allowance of contact or communication (e.g., a bucket value, described in more detail below) to be received by a particular communication layer or platform (e.g., within the platform machines 224) in a fixed period of time. In some example embodiments, each platform may vary a maximum allowance of contact for a period of time or vary the period of time based on an availability of platform resources. In some example embodiments, when contact directed to a platform is received by the contact machines 258 and the current allowance is less than or equal to zero, the contact limiting module 260 may reject initiation of the communication as shown in block 417 of FIG. 4. When the contact directed to the platform is received by the contact machines 258 and the current allowance is greater than or equal to one, the contact limiting module 260 may allow the initiation of communication to be routed to the platform as shown between blocks 416 and 418 of FIG. 4.

Alternatively or additionally, determination of whether to allow the initiation of communication may be made by a platform at block 418 after the contact limiting module has allowed the initiation of communication to be routed to the platform at block 416. In various example embodiments, a platform may reject the initiation of communication based on availability of platform resources or other conditions warranting a rejection. Such a rejection is represented by block 417.

In an example embodiment, in FIG. 2, a platform may allow the initiation of communication from the contact machines(s) 258. Example resource module(s) 270 located on the platform machine 224 and located on the other platform machines 225-226 may include various modules that provide services for multiple tenants. Example resource module(s) 270 may include interaction routers, interactive voice recordings, scripting, agent network server, media control and other contact center related services, etc.

In an example embodiment, the initiation of communication is a voice call from a customer seeking help with installing a water heater; the tenant is in the business of providing technical support for refrigerator installations and water heater installations. The tenant employs some agents who address questions about refrigerator installations while the tenant's other agents address questions about water heater installations.

At block 418, the flow diagram 400 includes the resource module(s) 270 of FIG. 2 allowing the initiation of communication and generating a request for data associated with a tenant, based on the initiation of communication. In the appliance installation example, the resource module(s) 270 request tenant data to be used to teleprompt the customer, prompting the customer to press 1 on their telephone dial for refrigerator installation support or to press 2 for water heater installation support.

Example platform machine(s) 224, 225 and 226 may initially request the data associated with the tenant from the extraction module 232 and the configuration module 236. In an example embodiment, to locate data for data access, the resource module(s) 270 may use a different addressing system than the configuration module 236 uses to locate and access the same data. In some example embodiments, the extraction module 232 translates requests from the platform machine(s) 224, 225, 226 to allow the configuration module 236 to understand the request. The configuration module 236 may access the requested data in the configuration data databases 240 and relay the requested data to the resource module(s) 270 on a set of platform machine(s) (e.g., platform machine(s) 224) via the extraction module 232.

The configuration module 236 may not initially locate the requested data in the configuration data databases 240. In some example embodiments, the configuration module 236 may request the location of the requested data from the data location module 246 that may be located within the platform management machine(s) 244.

At block 420, the flow 400 may include the data location module 246 providing the location of the requested data (e.g., the location within the configuration data databases 240) to the configuration module 236. The configuration module 236 may then access the requested data to provide it to the resource module(s) 270 via the extraction module 232.

At block 422 of the flow 400, the example resource module(s) 270 receive access to the requested data (e.g. tenant data). With access to the particular tenant data, an example resource module 270 may generate a particular response to the initiation of communication received from the agent or customer.

At block 424 of the flow 400, the resource module(s) 270 respond to the initiation of the communication based on the data (e.g., the tenant data). The agent or customer that initiated communication may receive the response where the flow ends at terminal 426. In the appliance installation support example, the response to the initiation at terminal 426 may be the tenant's teleprompter asking the customer to indicate the nature of the call.

Figure 5:
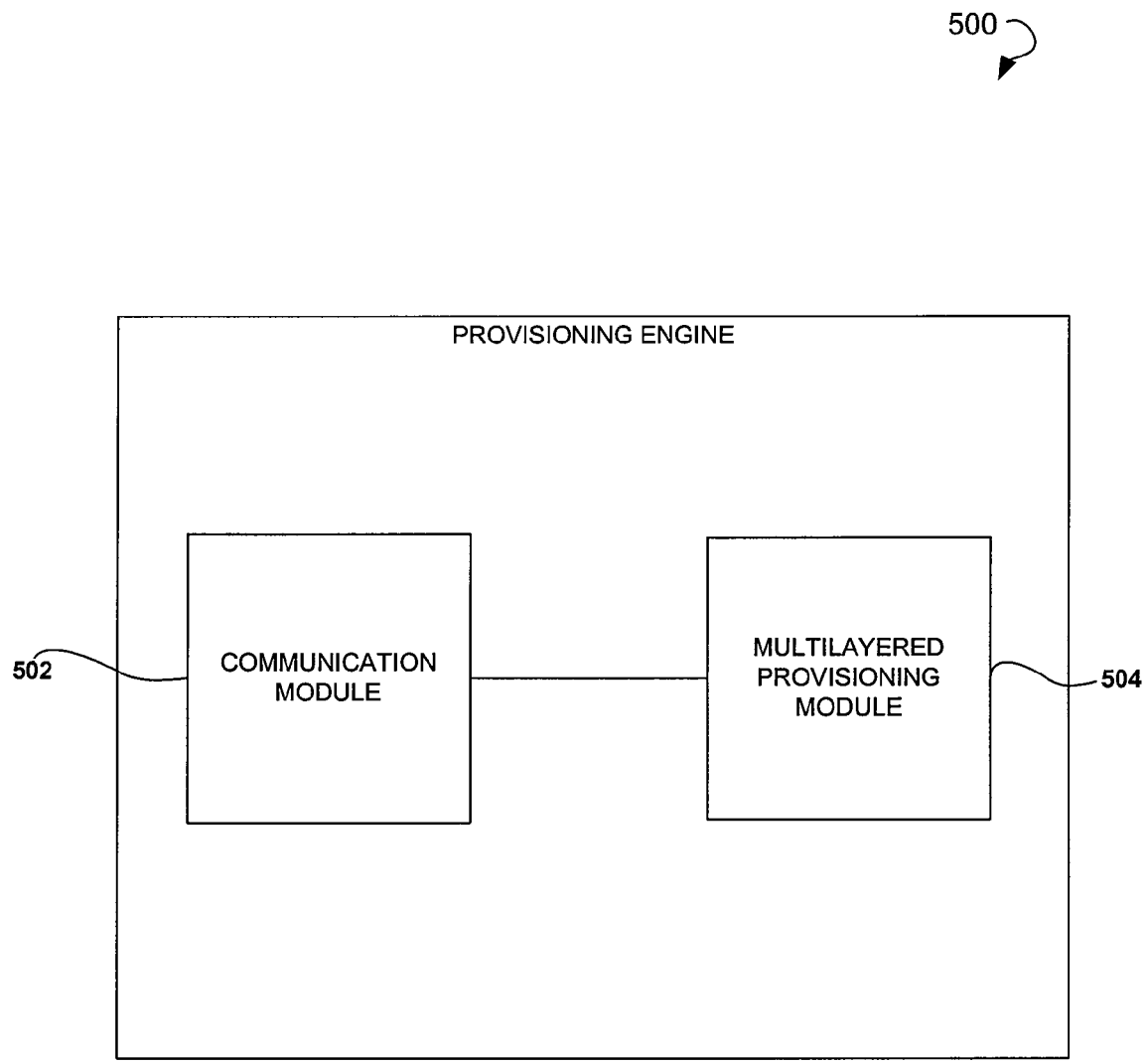
FIG. 5 is a block diagram illustrating a provisioning engine, in accordance with an example embodiment.

FIG. 5 is a block diagram illustrating a multilayer provisioning engine 500, in accordance with an example embodiment. The multilayer provisioning engine 500 is shown in FIG. 5 to include example components that may be configured to perform various operations facilitating multilayer provisioning of networked contact centers. In some example embodiments, the multilayer provisioning engine 500 may include a communication module 502 and a multilayered provisioning module 504.

The communication module 502 may be configured to receive a request from a tenant to modify the support service. The request may be entered via a web interface communicatively coupled to the communication module 502. For example, the tenant may request an increase in the number of agents simultaneously available to the tenant's customers. Upon approval, the requested modification increasing the number of agents available to the customers of the tenant may be implemented by the multilayered provisioning module 504. The modifications may include increasing capacity of the support services automatically without an explicit request from the tenant. Thus, when the number of requests exceeds the number of the available agents, the multilayered provisioning module 504 may respond by increasing the number of agent seats. Such an increase may be of a temporary nature.

The multilayered provisioning module 504 may be configured to provide support services to a customer in response to a request received by the communication module. The multilayered provisioning module 504 may be included within contexts of the networked contact centers 102 and 302, which are described with reference to FIG. 1 and FIG. 3 respectively. For example, a support service-providing module may include a virtual office used for the purpose of receiving and transmitting a large volume of requests by telephone for a company (e.g., an airline). The multilayered provisioning module 504 may be utilized to administer incoming product support or information inquiries from customers.

In addition to telephone calls, handling of faxes, e-mails, and various electronic messages may be performed. A support service-providing module may be operated by agents with virtual workstations that include a computer for each agent, a telephone set/headset connected to the computer, and one or more supervisor virtual stations. Examples of businesses that may utilize a support service-providing module to interact with their customers may include utility companies, mail order catalogue firms, and customer support for computer hardware and software.

The support service of the multilayered provisioning module 504 may be provided directly or through a distributor. A company may purchase the support services to provide support to its clients. This arrangement may eliminate the need for the company to build its own support center service. The multilayered provisioning module 504 may be utilized to provision support services to companies with multiple agents and customers. This provisioning arrangement may permit a fixed-cost handling of multi-layered distribution. Even though the multilayered distribution is described herein with references to networked contact centers, it will be understood that multi-layered distribution may be practiced within multiple businesses contexts. Utilization of the multi-layered distribution may permit fixing costs of distribution irrespective of the number of layers, branding reseller GUI, and per agent language localization. The provisioning may also permit a nearly instantaneous distribution of services to new clients.

The multilayered provisioning module 504 may be configured to provision the support services as well as modified support services to the customers of the client. Provisioning may refer to the creation, maintenance and deactivation of user objects and user attributes, as they exist in one or more systems, directories or applications, in response to automated or interactive business processes. Provisioning may include one or more of the following processes: change propagation, self-service workflow, consolidated user administration, delegated user administration, and federated change control. Services may include electronic mail, inclusion in a published user directory, access to a database, and access to a network or mainframe.

As already mentioned above multilayered provisioning module 504 may be included within the context of the networked contact center 102 described in more details with reference to FIG. 1. The networked contract center 102 may offer services to its tenants either directly or through distribution channels. The distribution channels may include multiple distributors of the services. Each distributor may be associated with multiple sub-distributors. The distributors may purchase services from the operators of the networked contact center 102 and resell the services to tenants or sub-distributors. The sub-distributors may purchase services from the distributors and resell to tenants. It will be noted that there may be multiple levels of distribution. However, the multilayer provisioning is described by way of example with reference to only two levels, distributor and sub-distributor.

Conventionally, a tenant desiring to increase a number of agents available to provide services to its customers (users of the hosted services) is required to call the host (a distributor or a sub-distributor) and request additional lines of service. The distributor or the sub-distributor has to respond by changing the configuration to increase the number of agent seats for the tenant.

Methods and systems for multilayer provisioning of networked contact centers permit a higher efficiency distribution system because only one host infrastructure is needed. Additionally, custom configurations may be available to the distributor to permit custom branding of its services. Thus, as long as the maximum number of customers is not violated, modifications and customizations may be performed automatically without human intervention. Some distributors may have famous brands that sell better than the generic service and, therefore, it may be financially beneficial to sell services under the distributor's brand. Higher revenues may be generated because the customers pay a higher price for the famous brand without additional costs of the distribution.

A company may sell its products and/or services directly, through a distributor, or both. Typically, a greater part (e.g., 90%) of revenues of a company with a multilayer distribution business model comes from the distributors. The revenues may be received from a few layers of distribution such as distributors and sub-distributors. In a typical two-layer distribution arrangement, a sub-distributor hosts the services it distributes. Methods and systems for multilayer provisioning of networked contact centers permit a single contact center to host services for multiple levels of distribution. Additionally, the multilayer provisioning engine 500 may label the services with a brand for its distributors and sub-distributors. Thereafter, each distributor or sub-distributor may resell services under a private label.

The foregoing approach permits tenants to buy services from a distributor or a sub-distributor without the distributor or the sub-distributor having to provide an infrastructure to support the services. The services provided are supported directly by the networked contact center 102. This approach eliminates the cost of provisioning done at the distributor or the sub-distributor level. Additionally, the methods and systems for multilayer provisioning of networked contact centers permit customizations of the services without direct involvement of the distributor or the sub-distributor. A representative designated by a tenant may use access provided by the networked contact center 102 to change service configurations of the tenant. For example, the tenant may increase the number of customers permitted to utilize the networked contact center 102 simultaneously without contacting the distributor or the sub-distributor. Various modules facilitating operations of the multilayered provisioning module 504 are described with reference to FIG. 6.

Figure 6:
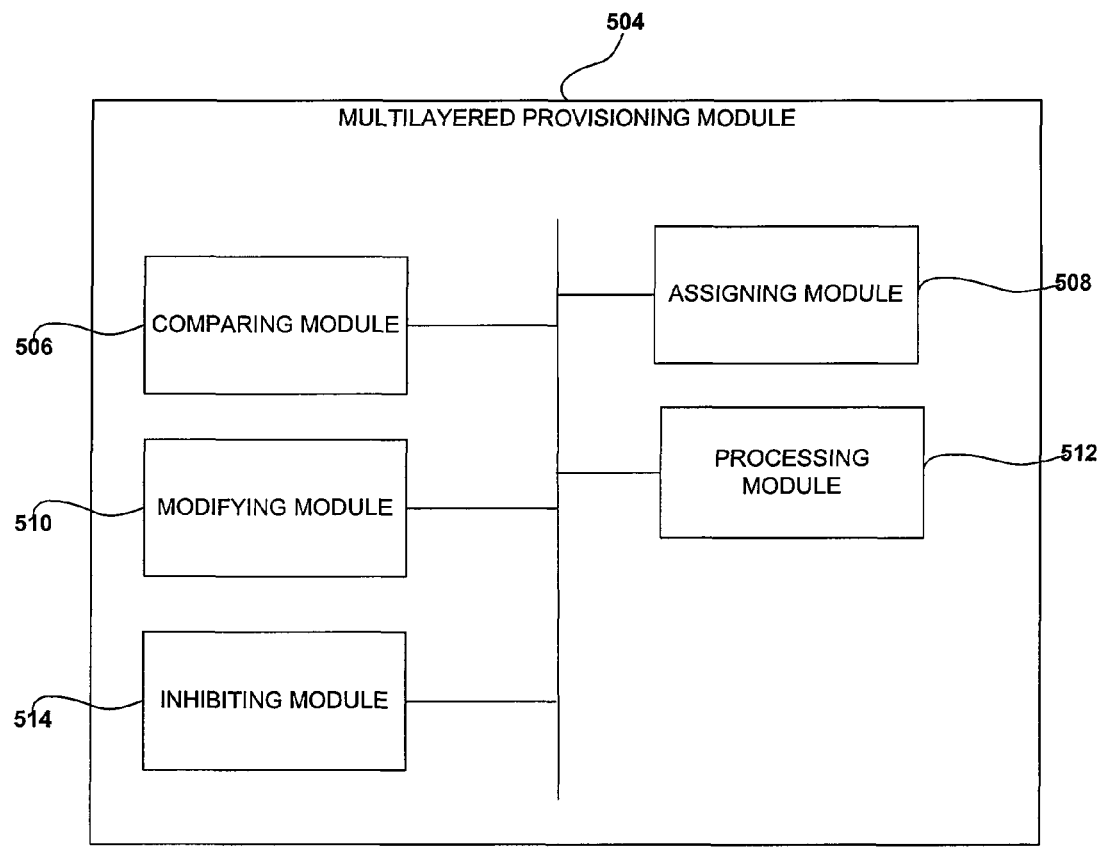
FIG. 6 is a block diagram illustrating a multilayer provisioning module, in accordance with an example embodiment.

FIG. 6 is a block diagram illustrating a multilayer provisioning module 504, in accordance with an example embodiment. The multilayer provisioning module 504 is shown in FIG. 6 to include several components that may be configured to perform various operations facilitating multilayer provisioning of networked contact centers. In some example embodiments, the multilayer provisioning module 504 may include a comparing module 506, an assigning module 508, a modifying module 510, a processing module 512, and an inhibiting module 514.

The comparing module 506 may be configured to compare the support services requested by the tenant with the currently existing support services. For example, the tenant may request an increase in the number of agent seats available to the tenant's customers. The comparing module may determine that the number of the seats requested is the same as the number of the seats currently available to the tenant. Based on this determination, the modifying module 510 may stay idle because no modification is required. Furthermore, the comparing module may not be able to perform the comparison because the tenant is a new tenant. If this is the case, the assigning module 508 may assign agent seats to the tenant. If, on the other hand, the comparing module is able to perform a comparison, the modifying module 510 may make changes to the number of the agent seats available to the tenant. Thus, if the comparing module determines that the number of the seats needs to be increased because the number of the currently available seats is lower than the number of the requested seats, the modifying module 510 may increase the number of seats up to the requested number. The maximum number of the agent seats available to the tenant may be limited by the inhibiting module 514 based on business rules set by the operators of the networked contact center.

The inhibiting module 514 may be configured to inhibit the capacity of the modifying module 510 or the assigning module 508 to provide support services based on the capacity limits established for the distributor. Additionally, the inhibiting module 514 may be configured to inhibit the capacity to provide support services based on credit limits established for the distributor as well as to inhibit the capacity of the support services based on capacity limits established for the client.

Moreover, the inhibiting module 514 may inhibit the modifying of the support service when the client does not provide a predetermined payment or when the capacity is a maximum number of the customers of the client being able to utilize the modified support service simultaneously. Various operations performed by the multilayer provisioning engine 500, according to an example embodiment, are described by a way of example with reference to FIG. 8 and FIG. 9.

Figure 7:
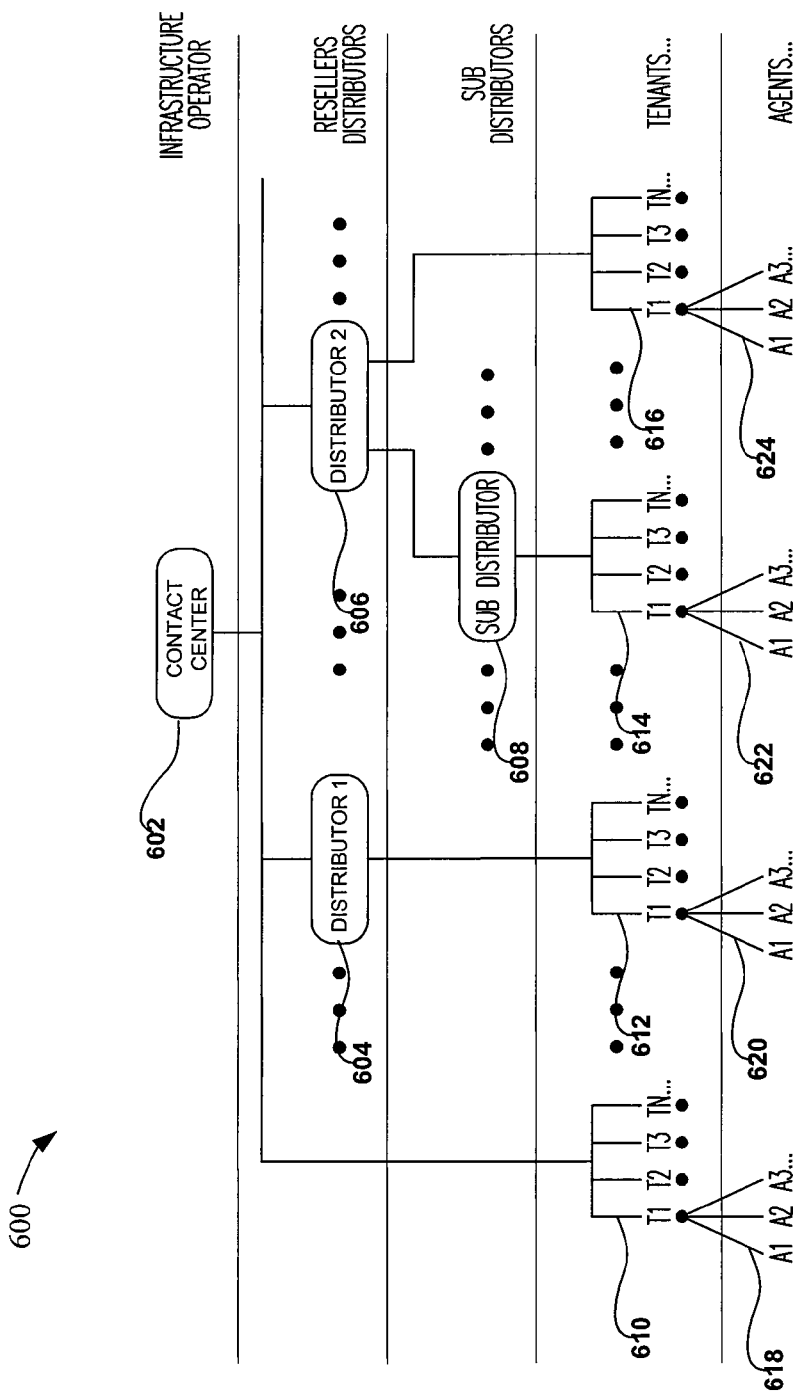
FIG. 7 is a diagram illustrating layers of a multilayer provisioning model, in accordance with an example embodiment.

FIG. 7 illustrates layers of multilayer provisioning model 600, in accordance with an example embodiment. The multilayer provisioning model 600 may include a contact center 602 (an infrastructure operator), distributors 604 and 606, sub-distributors 608, tenants 610, 612, 614, and 616, and agents 618, 620, 622, and 624. The contact center 602 may be substantially similar to the networked contact centers 102 and 302 described in greater detail with reference to FIG. 1 and FIG. 3 above. In some example embodiments, distributors 604, 606, as well as a sub-distributor 608 are intermediaries between the contact center 602 and the tenants 610, 612, 614, and 616.

In some example embodiments, there may be multiple layers of intermediaries, each passing the support services down to the next layer, before the services finally reach the tenants 610, 612, 614, and 616. Layers of distribution may be known by further names such as, for example, tiers. In a one-layer model of distribution, the services are provided directly to the tenants 610, 612, 614, and 616. In a two-layer model of distribution, the services are provided to the tenants 610, 612, 614, and 616 via the distributors 604 and 606. It may be desirable to have multiple levels of distribution in larger markets to achieve wider distribution despite additional costs. Agents 618, 620, 622, and 624, in some example embodiments, are employees of one or more tenants assigned to handle communications from customers of their respective tenants. For example, in FIG. 6, the agents 618 may be responsible for providing support to customers of the tenant 610.

Figure 8:
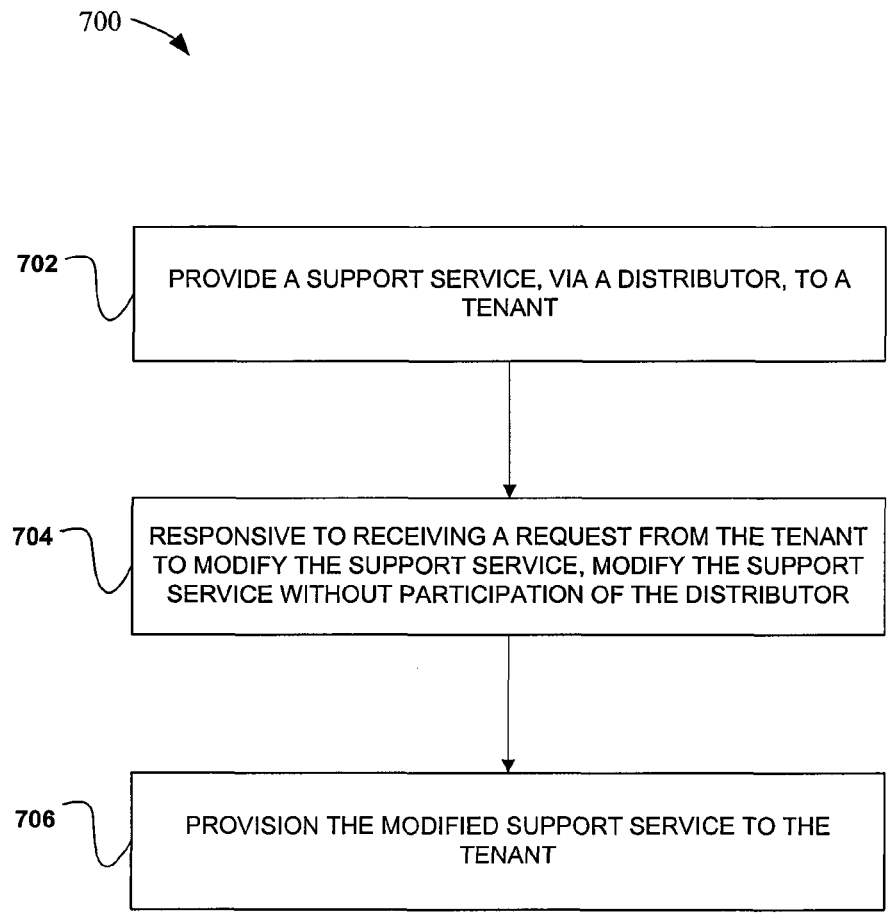
FIG. 8 is a flow diagram illustrating a high-level method for multilayer provisioning of networked contact centers, in accordance with an example embodiment.

FIG. 8 is a flow diagram illustrating a high-level method 700 for multilayer provisioning of networked contact centers, in accordance with an example embodiment. The method 700 may be performed by processing logic (e.g. dedicated logic, programmable logic, microcode, etc.) that may comprise hardware, software (such as that run on a general-purpose computer system or a dedicated machine), or a combination of both. In one example embodiment, the method 700 may be performed by the various modules discussed above with reference to FIG. 5. Each of these modules may comprise processing logic.

As shown in FIG. 8, the method 700 may commence at operation 702 with the multilayered provisioning module 504 providing a support service, via a distributor, to a tenant. Thus, the multilayered provisioning module 504 may provide an agent associated with a particular tenant dedicated to providing services to a particular tenant. At operation 704, the multilayered provisioning module 504 may modify the support service in response to the communication module 504 receiving a request from a tenant to modify the support service. For example, the number of the agents associated with a particular tenant may be insufficient to handle communications originated by customers of the tenant. Accordingly, the tenant or a distributor may request an increase in the number of agents associated with the tenant.

At operation 706, the multilayered provisioning module 504, in response to the request by the tenant, may provision the modified support service to the tenant. For example, the multilayered provisioning module 504 may increase the number of agents associated with the tenant.

Figure 9:
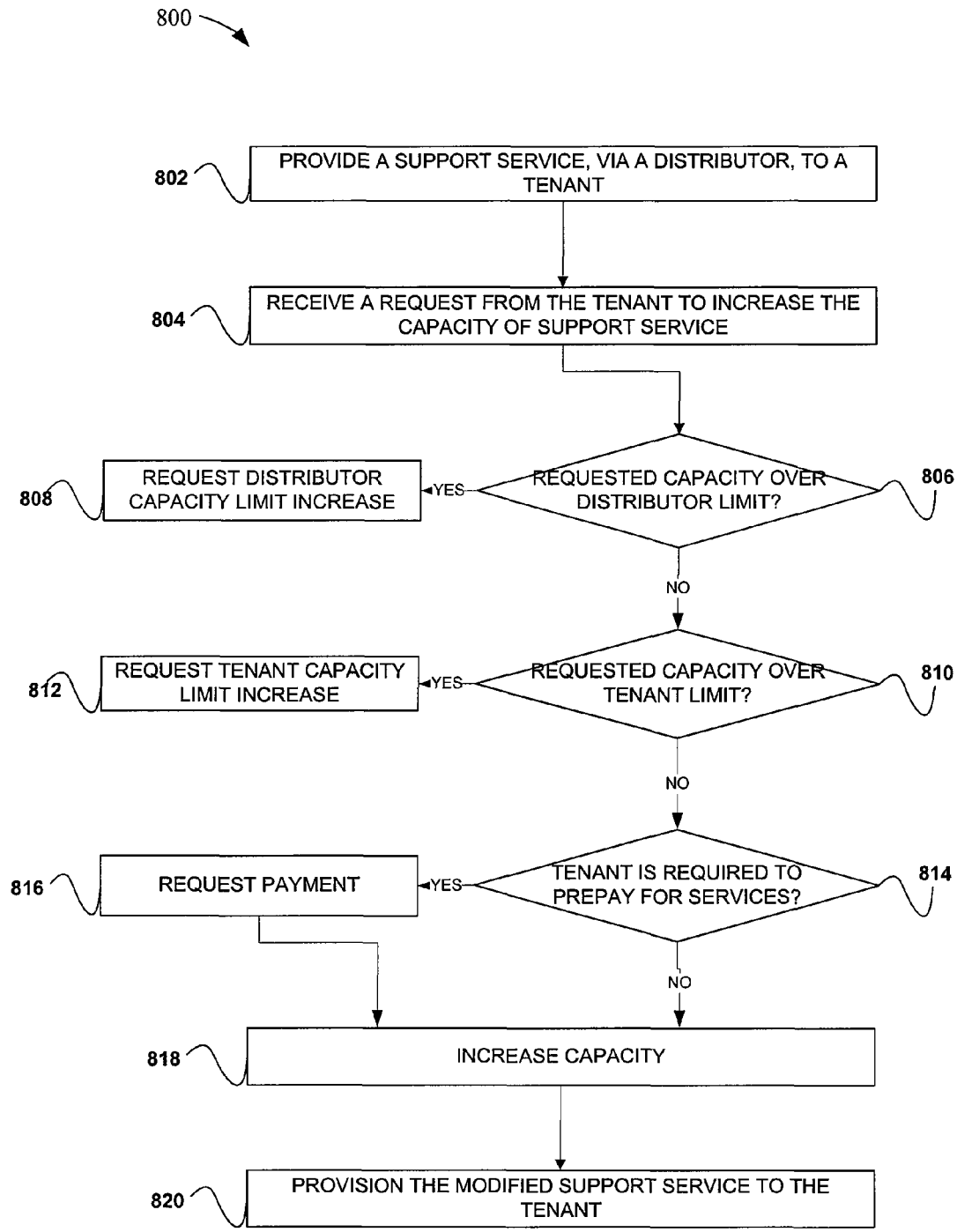
FIG. 9 is a flow diagram illustrating a further more detailed method for multilayer provisioning of networked contact centers, in accordance with an example embodiment.

FIG. 9 is a flow diagram illustrating a further more detailed method 800 for multilayer provisioning of contact centers, in accordance with an example embodiment. As shown in FIG. 9, the method 800 may commence at operation 802 with the multilayered provisioning module 504 providing a support service, via distributor, to a tenant. Operation 802 may be substantially similar to the operation 702 described with reference to FIG. 8. At operation 804, the communication module 502 may receive a request from the tenant to increase the capacity of the support services provided. Furthermore, a distributor may request an increase in the number of agents available to some or all of its tenants. The contact center 602 may establish a maximum capacity limit for the distributor. At decision block 806, the multilayered provisioning module 504 may determine whether the requested capacity is over the maximum limit established for the distributor. If the requested capacity is over the maximum limit, the communication module 502, at operation 808, may suggest to the distributor a way to increase its maximum capacity limit.

If, on the other hand, the requested capacity limit is not over the maximum limit established for the distributor, method 800 may proceed to decision block 810. At decision block 810, the processing module 512 may determine whether the requested capacity is over the maximum limit established for the tenant. If the requested capacity is over the maximum limit, the method 800 may proceed to operation 812. At operation 812, the communication module 502 may request a capacity limit increase for the tenant.

If, on the other hand, the requested capacity is not over the maximum limit established for the client, method 800 may proceed to decision block 814. At decision block 814, the multilayered provisioning module 504 may determine whether the client is required to prepay for the services. If it is determined at decision block 814 that the client is required to prepay for the services, at operation 816, the communication module 502 may request a prepayment made by the tenant. If, on the other hand, at decision block 814 the multilayered provisioning module 504 determines that the tenant is not required to prepay for the services, method 800 may proceed to operation 818. At operation 818, the multilayered provisioning module 504 may increase the maximum number of agents available. At operation 820, the multilayered provisioning module 504 may provision the modified support service to the tenant by making a greater number of agents available to receive communications.

Figure 10:
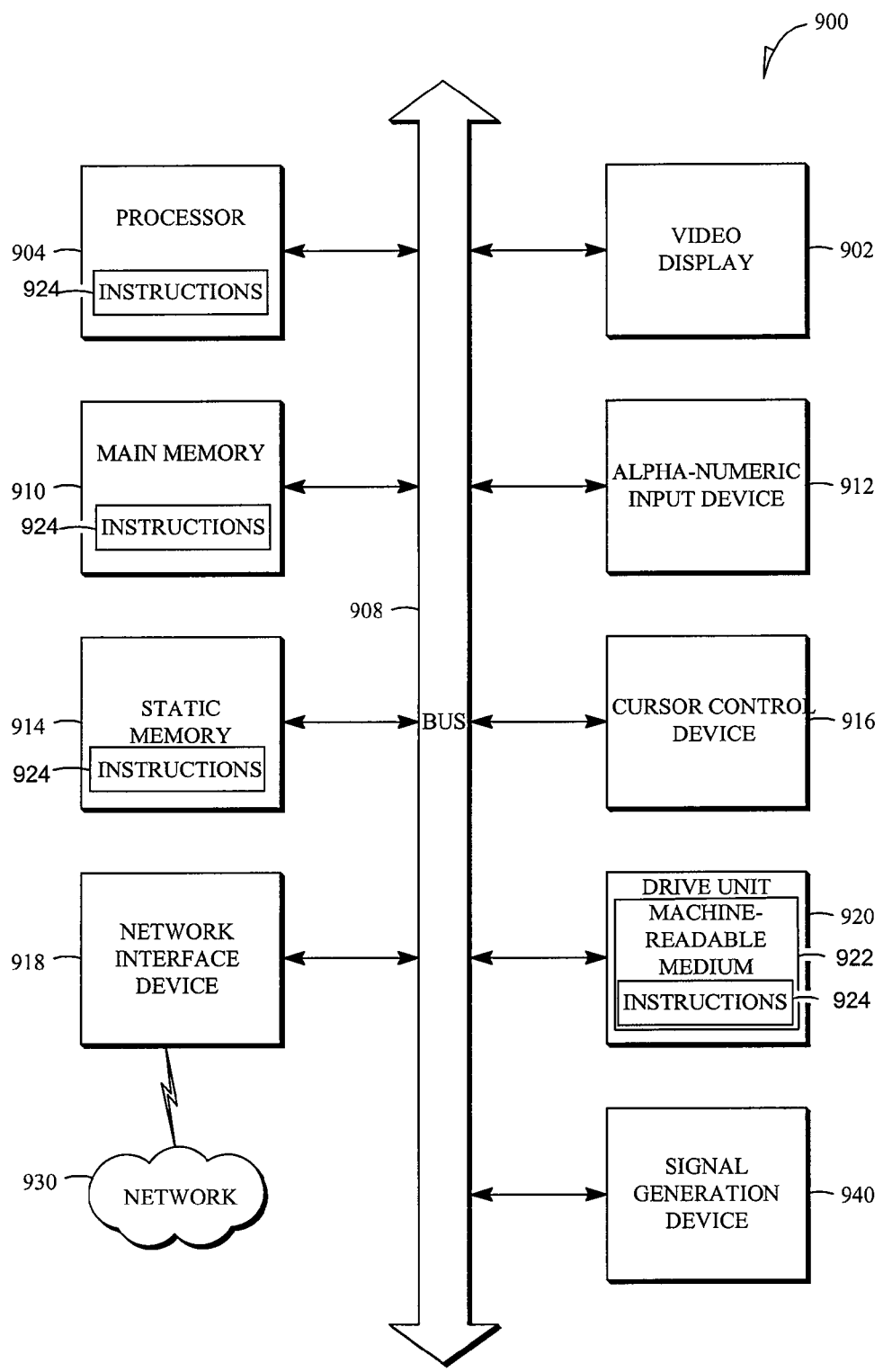
FIG. 10 is a diagrammatic representation of an example machine in the form of a computer system within which a set of instructions for causing the machine to perform any one or more of the methodologies discussed herein may be executed.

FIG. 10 shows a diagrammatic representation of a machine in the example form of a computer system 900 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a PC, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 904 (e.g., a central processing unit (CPU), a graphics processing unit (GPU) or both), a main memory 910 and a static memory 914 which communicate with each other via a bus 908. The computer system 900 may further include a video display unit 902 (e.g., a liquid crystal display (LCD) or a cathode ray tube (CRT)). The computer system 900 also includes an alphanumeric input device 912 (e.g., a keyboard), a cursor control device 916 (e.g., a mouse), a disk drive unit 920, a signal generation device 940 (e.g., a speaker) and a network interface device 918.

The disk drive unit 920 includes a machine-readable medium 922 on which is stored one or more sets of instructions 924 (e.g., software) embodying any one or more of the methodologies or functions described herein. The instructions 924 may also reside, completely or at least partially, within the main memory 910 and/or within the processor 904 during execution thereof by the computer system 900, the main memory 910 and the processor 904 also constituting machine-readable media.

The instructions 924 may further be transmitted or received over a network 930 via the network interface device 918. While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present subject matter. The term "machine-readable medium" shall accordingly be taken to include, but not be limited to, solid-state memories, optical and magnetic media, and carrier wave signals.

The above description is intended to be illustrative and not restrictive. For example, the above-described embodiments (or one or more aspects thereof) may be used in combination with each other. Other embodiments will be apparent to those of skill in the art upon reviewing the above description. The scope of the claims should, therefore be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What we claim is:

1. A computer-implemented method for distribution of services of a contact center, the method comprising:
provisioning an initial support service, via a distributor, to a tenant that is an entity using the contact center to address contact from other entities with whom the tenant has a relationship, the distributor purchasing the initial support service from the contact center for distribution to the tenant, the initial support service allocating an amount of resources of the contact center for use by the tenant;
responsive to receiving a request from the tenant to modify the initial support service, modifying the initial support service without participation of the distributor, the modifying of the initial support service causing a change in the amount of the contact center resources allocated for use by the tenant; and
provisioning the modified support service to the tenant.

2. The computer-implemented method of claim 1, wherein the change in the amount of the contact center resources caused by the modifying of the support service includes increasing a capacity of the initial support service in response to an increased demand by the tenant.

3. The computer-implemented method of claim 2, further comprising inhibiting the modifying of the initial support service based on capacity limits established for the distributor.

4. The computer-implemented method of claim 2, further comprising inhibiting the modifying of the initial support service based on credit limits established for the distributor.

5. The computer-implemented method of claim 2, further comprising inhibiting the increasing of the capacity of the initial support service based on capacity limits established for the tenant.

6. The computer-implemented method of claim 2, further comprising inhibiting the increasing of the capacity of the initial support service based on credit limits established for the tenant.

7. The computer-implemented method of claim 1, further comprising requesting the tenant to provide a payment for the modified support service.

8. The computer-implemented method of claim 1, further comprising inhibiting of the modifying of the initial support service when the tenant does not provide a payment.

9. A system for distribution of services of a contact center comprising:
at least one contact center machine having at least one processor;
a communication module, implemented by the at least one processor, configurable to receive a request from a tenant to modify a initial support service, the initial support service being provisioned, via a distributor, to the tenant that is an entity using the contact center to address contact from other entities with whom the tenant has a relationship, the distributor purchasing the initial support service from the contact center for distribution to the tenant, and the initial support service allocating an amount of resources of the contact center for use by the tenant; and
provisioning module, implemented by the at least one processor, configurable to
modify the support service without participation of the distributor in response to receiving the request, the modifying of the initial support service causing a change in the amount of the contact center resources allocated for use by the tenant, and
provision the modified support service to the tenant.

10. The system of claim 9, wherein the provisioning module is to increase a capacity of the initial support service in response to an increased demand by the tenant.

11. The system of claim 10, further comprising an inhibiting module to inhibit the modifying of the initial support service.

12. The system of claim 11, wherein the inhibiting module is to inhibit the modifying of the initial support service based on credit limits established for the distributor.

13. The system of claim 11, wherein the inhibiting module to inhibit the modifying of the initial support service based on capacity limits established for the tenant.

14. The system of claim 11, wherein the inhibiting module is to inhibit the modifying of the initial support service based on credit limits established for the tenant.

15. The system of claim 11, wherein the inhibiting module is to inhibit the modifying of the initial support service when the tenant does not provide a payment.

16. The system of claim 9, wherein the provisioning module is to request the tenant to provide a payment for the modified support service.

17. The system of claim 9, wherein a number of customers of the tenant being able to utilize the modified support service is limited by a predetermined number.

18. The system of claim 9, wherein the provisioning module is a virtual contact center.

19. The system of claim 18, wherein the virtual contact center is to receive and transmit one or more of the following: telephone calls, electronic mails, electronic messages, and facsimiles.

20. A computer-readable storage medium comprising instructions, which when implemented by one or more processors, perform the following operations:
provisioning an initial support service, via a distributor, to a tenant that is an entity seeking to address contact from other entities with whom the tenant has a relationship, and the distributor purchasing the initial support service from the contact center for distribution to the tenant, the initial support service allocating an amount of resources of the contact center for use by the tenant;
responsive to receiving a request from the tenant to modify the initial support service, modify the initial support service without participation of the distributor, the modifying of the initial support service causing a change in the amount of the contact center resources allocated for use by the tenant; and
provision the modified support service to the tenant.

21. The computer-readable storage medium of claim 20, wherein the change in the amount of the contact center resources caused by the modifying of the support service includes increasing a capacity of the initial support service in response to an increased demand by the tenant.

22. A computer-implemented apparatus for distribution of services of a contact center, said apparatus comprising:
means for a provisioning an initial support service, via a distributor, to a tenant that is an entity seeking to address contact from other entities with whom the tenant has a relationship, and the distributor purchasing the initial support service from the contact center for distribution to the tenant, the initial support service allocating an amount of resources of the contact center for use by the tenant;

means for modifying the initial support service without participation of the distributor in response to receiving a request from the tenant to modify the initial support service, the modifying of the initial support service causing a change in the amount of the contact center resources allocated for use by the tenant; and means for provisioning the modified support service to the tenant.

23. The computer-implemented apparatus of claim 22, further comprising means for inhibiting the modifying of the initial support service based on capacity limits established for the distributor.

24. The computer-implemented apparatus of claim 22, further comprising means for requesting the tenant to provide a payment for the modified support service.

\* \* \* \* \*